United States Patent [19]

Gupta et al.

[11] Patent Number: 5,695,689

[45] Date of Patent: Dec. 9, 1997

[54] POLYETHER POLYOLS STABILIZED WITH TOCOPHEROL

[75] Inventors: Pramod Gupta, Bedburg; Hansjürgen Rabe, Leverkusen, both of Germany

[73] Assignee: Bayer Aktiengesellschaft, Leverkusen, Germany

[21] Appl. No.: 530,628

[22] Filed: Sep. 20, 1995

[30] Foreign Application Priority Data

Oct. 4, 1994 [DE] Germany ............... 44 35 474.6

[51] Int. Cl.$^6$ ................................................... C09K 15/22
[52] U.S. Cl. ........................... 252/403; 252/399; 252/401; 252/405; 252/407; 524/258; 549/408; 521/114
[58] Field of Search ......................... 252/399, 403, 252/401, 405, 407; 521/114; 524/258; 549/408

[56] References Cited

U.S. PATENT DOCUMENTS

| | | | |
|---|---|---|---|
| 4,021,385 | 5/1977 | Austin et al. | 260/2.5 BB |
| 4,070,304 | 1/1978 | Hinze | 252/404 |
| 4,371,647 | 2/1983 | Minagawa et al. | 524/120 |
| 4,444,676 | 4/1984 | Statton et al. | 252/182 |
| 4,925,888 | 5/1990 | Aumueller et al. | 524/91 |
| 5,006,599 | 4/1991 | Gupta et al. | 524/740 |
| 5,218,008 | 6/1993 | Parrish | 521/114 |
| 5,516,920 | 5/1996 | Nesvadba et al. | 549/307 |

FOREIGN PATENT DOCUMENTS

| | | |
|---|---|---|
| 725926 | 10/1942 | Germany . |
| 3725926 | 2/1989 | Germany . |
| 2260764 | 4/1993 | United Kingdom . |
| 93/10178 | 5/1993 | WIPO . |

*Primary Examiner*—Sharon Gibson
*Assistant Examiner*—Deanna Baxam
*Attorney, Agent, or Firm*—Joseph C. Gil; Lyndanne M. Whalen

[57] ABSTRACT

α- and/or β-tocopherol (vitamin E), optionally in combination with octylated diphenylamines, is combined with a polyether polyol having a molecular weight of from about 300 to about 10,000 to stabilize that polyether polyol. Polyether polyols which are stabilized in this manner are particularly useful in the production of polyurethanes and polyurethane foams with a reduced tendency toward discoloration.

3 Claims, No Drawings

POLYETHER POLYOLS STABILIZED WITH TOCOPHEROL

BACKGROUND OF THE INVENTION

The present invention relates to polyether polyols which are stabilized with tocopherol, particularly α- and/or β-tocopherol (vitamin E), to a process for producing such stabilized polyether polyols and to polyurethanes produced from these stabilized polyether polyols.

Stabilizers or antioxidants for polyether polyols and polyurethanes are known. Examples of typically used stabilizers and antioxidants include sterically hindered phenols, bisphenols, dialkyl diphenylamines, phenothiazines, phosphites, and mixtures of these types of materials. (See, for example, U.S. Pat. Nos. 4,070,304 and 4,444,676; DE 2,557,619; and EP 38,876.)

The effectiveness of an antioxidant is determined primarily by the type of material it is (i.e., whether it is a diphenylamine, a phenothiazine, or a sterically hindered phenol) and also by its compatibility with the particular substrate. 2,6-di-tert.-butyl-4-methylphenol (BHT), alone or in combination with another compound from the previously mentioned types of materials, is most frequently used for stabilizing polyether polyols. The use of 3,5-di-tert.-butyl-4-hydroxyphenylpropionic acid (BHP) as a stabilizer is also known. (See DE 33,842,945.)

The disadvantages of BHT include its relatively high volatility, its tendency to migrate into substrates which cover polyurethanes, and pronounced yellowing of the substrates in atmospheres containing $NO_x$. A stabilizer without these disadvantages would therefore be of interest to those skilled in the art.

Mixtures of at least one sterically hindered amine with a UV absorber and antioxidant selected from sterically hindered phenols, phosphites and vitamin E and its derivatives are known. (See, e.g., EP 0,312,927 and DE 725,926.) Mixtures of monophosphite, diphosphite, monophosphonites, diphosphonites, or α-tocopherol (or its derivatives) and a polymeric polysiloxane containing a sterically hindered amine light stabilizer have also been disclosed as stabilizers for polymeric compounds. (See, e.g., DE 4,233,973.)

SUMMARY OF THE INVENTION

It is an object of the present invention to provide stabilized polyether polyols which are useful in the production of polyurethanes.

It is another object of the present invention to provide a process for stabilizing polyether polyols in which the stabilizer is not as highly volatile as BHT and does not have the tendency to migrate.

It is a further object of the present invention to provide polyurethanes which do not exhibit the yellowing experienced when a BHT-stabilized polyether polyol is used.

These and other objects which will be apparent to those skilled in the art are accomplished by adding tocopherol (also known as vitamin E) to a polyether polyol having a molecular weight of from about 300 to about 10,000 in an amount sufficient to stabilize that polyether polyol.

DETAILED DESCRIPTION OF THE PRESENT INVENTION

Surprisingly, it has been found that tocopherol, particularly α- and/or β-tocopherol, alone is outstandingly suitable as a stabilizing antioxidant for polyether polyols having molecular weights of from about 300 to about 10,000, preferably from about 500 to about 7000. From about 0.01 to about 1.0% by weight, preferably from about 0.4 to about 0.8% by weight of tocopherol, based on the weight of the polyether polyol to be stabilized is generally effective. The optimum amount of tocopherol will, of course, depend on the specific polyether polyol.

A synergistic effect is observed when OCD (octylated diphenylamine) is used in conjunction with the tocopherol. When a combination of tocopherol and octylated diphenylamine is used to stabilize a polyether polyol, from about 0.01 to about 0.5% by weight, preferably from about 0.02 to about 0.2% by weight, of α- and/or β-tocopherol, based on the weight of the polyether polyol to be stabilized is used with from about 0.01 to about 0.5% by weight, preferably from about 0.02 to about 0.2% by weight, of OCD based on the weight of the polyether polyol to be stabilized.

α-and/or β-tocopherol, which are commercially available in solid or liquid form, are suitable stabilizers for all of the commonly used polyether polyols. Examples of polyether polyols which may be stabilized in accordance with the present invention include mono-, di-, tri-, tetra- and hexafunctional polyether polyols as well as polyether polyols of fractional functionality which are produced by the reaction of epoxides such as ethylene and propylene oxide with combinations of starter alcohols such as glycerine or trimethylolpropane. These polyether polyols may be produced from conventional epoxides in their pure form or in any desired combinations. (See, e.g., G. Oertel, Kunststoff-Handbuch [Plastics Handbook], Volume F, Polyurethane, Carl Hanser Verlag, Munich, 1993, page 58 et seq.)

Polyurethanes and polyurethane foamed materials manufactured from formulations which include a polyether polyol stabilized in accordance with the present invention, and an organic polyisocyanate in the presence of a blowing agent exhibit improved behavior with respect to discoloration of the matrix and remain inert with respect to yellowing of coverings (textiles, leather) under the effect of $NO_x$ gases (in industrial areas or areas with heavy traffic). That is, the polyurethanes and polyurethane foams produced from polyether polyols stabilized in accordance with the present invention do not discolor like polyurethanes produced with polyether polyols stabilized in known manner with BHT.

Having thus described the present invention, the following Examples are given as being illustrative thereof. All percentages given in these Examples are percentages by weight.

EXAMPLES

Example 1

A long chain polyether containing EO (ethylene oxide) and PO (propylene oxide), with an OH number of 46, a molecular weight of about 4000, and containing secondary hydroxyl groups, was prepared with one of the following:

| | | |
|---|---|---|
| 1a) | 0.3% | α-tocopherol (vitamin E); or |
| 1b) | 0.1% | α-tocopherol and 0.1% octylated diphenylamine (commercially available under the name Vulkanox OCD ® from Bayer AG); or |
| 1c) | 0.1% | octylated diphenylamine (Vulkanox OCD ® from Bayer). |

Each of the polyether polyols was used to produce a polyurethane foam. The soft foam formulation used to prepare each of samples 1a), 1b), and 1c) was the same with the exception of the stabilizer.

In a special hot air test, they exhibited discolorations around the point of air injection of:

1a) 6 cm² yellow
1b) 2 cm² yellow
1c) 60 cm² yellow, 18 cm² brown.

The standard temperature of the hot air was 202° C. The temperature inside the foam was 202° C. for samples 1a) and 1b), and 206° C. for 1c).

In a "yellowing test" on foam samples covered with terry toweling material there was no yellowing of the terry material covering samples 1a) and 1b). For sample 1c), there was a slight pink coloration of the foam in the region of the circulating air flow.

Example 2

A long chain polyether containing EO and PO, with an OH number of 35, a molecular weight of about 5000, and containing primary hydroxyl groups, was combined with:

| | | |
|---|---|---|
| 2a) | 0.05% | α-tocopherol and 0.05% octylated diphenylamine; or |
| 2b) | 0.2% | 3,5-di-tert.-butyl-4-methylphenol (commercially available under the name Vulkanox KB ® from Bayer AG) and 0.1% octylated diphenylamine (Vulkanox OCD ®). |

Each of these polyether polyols was included in a soft foam formulation in which the only difference was the material used to stabilize the polyether polyol. In a special hot air test, the foam samples exhibited discolorations around the point of air injection of:

2a) a trace of yellow 2b) 55 cm² yellow, 12 cm² brown.

The clear superiority of the α-tocopherol/octylated diphenylamine combination compared with a conventional BHT combination is evident here also.

A "yellowing test" on foam samples covered with terry toweling material gave the following results:

2a) no discoloration of the material b) characteristic yellowing in the region of the circulating air flow.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A stabilized polyether polyol consisting essentially of a) a polyether polyol having a molecular weight of from about 300 to about 10,000, b) from about 0.01 to about 0.5% by weight of tocopherol, and c) from about 0.01 to about 0.5% by weight of octylated diphenylamine.

2. A process for stabilizing a polyether polyol consisting essentially of combining a) a polyether polyol having a molecular weight of from about 300 to about 10,000 with b) from about 0.01 to about 0.5% by weight of tocopherol and c) from about 0.01 to about 0.5% by weight of octylated diphenylamine.

3. A process for the production of a polyurethane foam comprising reacting an organic polyisocyanate with the stabilized polyether polyol of claim 1 in the presence of a blowing agent.

* * * * *